United States Patent [19]

Frengley et al.

[11] Patent Number: 5,621,967
[45] Date of Patent: Apr. 22, 1997

[54] METHOD OF MAKING A LEADING EDGE WEIGHT RETENTION ASSEMBLY FOR A HELICOPTER ROTOR

[75] Inventors: Michael C. Frengley, Chandler; Thu N. Vu, Tempe, both of Ariz.

[73] Assignee: McDonnell Douglas Helicopter Co., Mesa, Ariz.

[21] Appl. No.: 484,932

[22] Filed: Jun. 7, 1995

Related U.S. Application Data

[62] Division of Ser. No. 210,579, Mar. 18, 1994, Pat. No. 5,462,409.

[51] Int. Cl.⁶ ................................................ B23P 15/00
[52] U.S. Cl. .................. 29/889.6; 29/889.61; 29/889.72
[58] Field of Search ........................ 29/889.72, 889.7, 29/889.6, 889.61; 416/144, 22 C, 229 R, 229 A

[56] References Cited

U.S. PATENT DOCUMENTS

| | | |
|---|---|---|
| 2,754,917 | 7/1956 | Kee ........................................ 416/144 |
| 3,814,540 | 6/1974 | Schramm et al. . |
| 3,967,996 | 7/1976 | Kamov et al. . |
| 4,150,920 | 4/1979 | Belko et al. . |
| 4,316,700 | 2/1982 | Schramm . |
| 4,524,999 | 1/1985 | Grimes et al. ........................ 29/889.61 |
| 4,650,534 | 3/1987 | Mussi et al. . |
| 4,806,077 | 2/1989 | Bost ........................................ 416/144 |
| 5,042,968 | 8/1991 | Fecto ........................................ 29/889.6 |
| 5,248,242 | 9/1993 | Lallo et al. ............................ 29/889.61 |

FOREIGN PATENT DOCUMENTS

| | | | |
|---|---|---|---|
| 1138244 | 6/1957 | France ........................................ 416/144 |
| 1544294 | 10/1968 | France ........................................ 416/144 |

*Primary Examiner*—Irene Cuda
*Attorney, Agent, or Firm*—Donald E. Stout

[57] ABSTRACT

A method for making helicopter rotor blades includes wrapping a prepreg strap around the conical or cylindrical outboard end of each weight segment. The weight segment is then placed in the rotor blade spar and goes through the spar cure cycle with it. Primary retention is provided by adhesive bonding between the weight and the spar. Secondary retention is by hoop tension in the strap, acting through interlaminar shears at the co-cured interface with the spar.

6 Claims, 2 Drawing Sheets

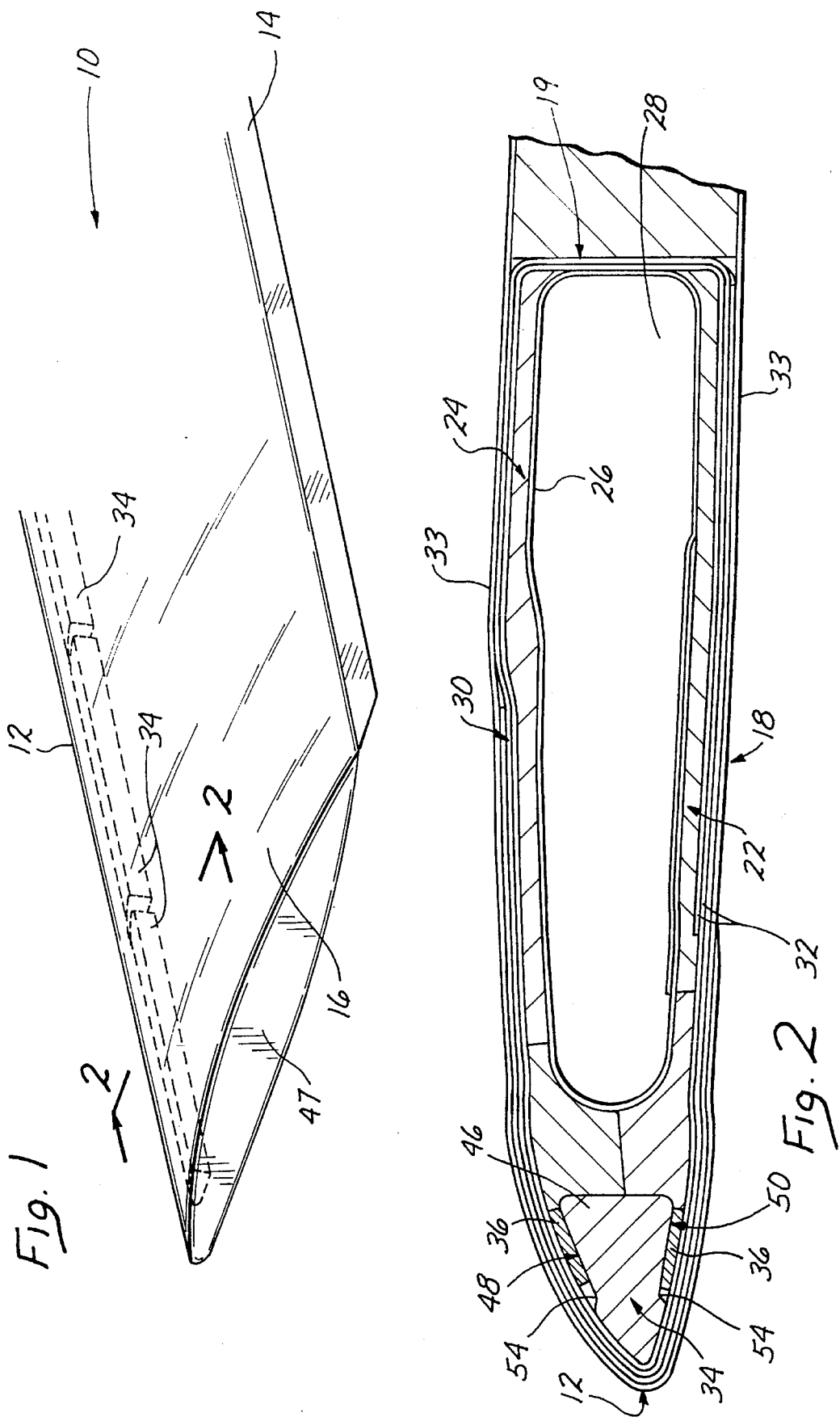

METHOD OF MAKING A LEADING EDGE WEIGHT RETENTION ASSEMBLY FOR A HELICOPTER ROTOR

This is a division of application Ser. No. 08/210,579, filed Mar. 18, 1994, now U.S. Pat. No. 5,462,409.

BACKGROUND OF THE INVENTION

This invention relates to a rotor blade assembly for a helicopter, and more particularly to a leading edge weight assembly for a helicopter rotor blade which provides substantially fail-safe retention of the weight segments.

It is well known in the art that aerodynamic rotor blades utilized for helicopter flight require leading edge weights to provide blade chordwise balance and maintain rotor inertia. The weights are typically mounted to the rotor blades by an adhesive, such that they become bonded to the blades. However, provision for the retention of helicopter rotor blade leading edge weights in a high centrifugal force field, after failure of the primary adhesive bond, is necessary, in order to prevent loosening of the weights and a potentially dangerous condition, which could result in a catastrophic failure of the rotor blade.

In the prior art, secondary mechanical retention of the weights is usually accomplished by mechanical fastening. For example, fittings are often riveted directly to the rotor blade spar, and the weights are mounted, usually with studs and nuts, to the tip weight fitting. Other methods include wrapping some or all of the fibers of a composite spar through a slot or around a hook in the weight, or attaching the weight to the spar with bolts and/or rivets. Unfortunately, these kinds of prior art methods involve laborious manufacturing procedures, extensive employment of hardware, and a corresponding increase in weight beyond that necessary to balance the rotor. Furthermore, the use of bolts and rivets interrupts the fibers of a composite spar or creates stress concentrations in a metal spar, both of which conditions should be avoided.

Consequently, what is needed is a simple mechanical solution for retaining helicopter rotor leading edge weights, which requires little or no additional hardware, is substantially fail-safe, and does not complicate the winding of the spar.

SUMMARY OF THE INVENTION

This invention provides a leading edge weight assembly for a helicopter rotor blade having a weight retention means which is fail-safe, mechanically simple, easy to install, and applicable to any balance or inertial weights installed in a composite helicopter rotor blade spar.

More specifically, the inventive rotor blade comprises a spar, a leading edge, a trailing edge and a weight assembly installed in the blade adjacent to the leading edge. The weight assembly includes a weight element and a retention element at least partially surrounding the weight element. The weight element includes an outboard end, and the retention element comprises a fiber-reinforced plastic strap which is wrapped around the outboard end.

A key feature of the invention is that the rotor blade, being a composite structure, is cured to laminate the laid up fabric layers, and the retention straps are co-cured with the spar. The weight element must have a length sufficient to ensure that the co-cured joint between the strap and the spar is strong enough to permit the strap to substantially solely retain the weight element during rotational operation of the rotor blade.

Another important feature of the invention is that the retention strap comprises a first leg, a second leg, and a curved segment joining the two legs at one end thereof, and is adapted to be wrapped about the weight element outboard end such that the first and second legs are substantially flush mounted on upper and lower surfaces of the weight element. Accordingly, the curved segment is wrapped about the outboard end of the weight element. The strap is wrapped about the outboard end of the weight element in order robe properly positioned to retain its corresponding weight element against centrifugal forces generated by the rotating blade. Significantly, the outboard end is geometrically shaped to ensure that the first and second legs of the strap are substantially parallel to one another spanwise, and to upper and lower surfaces, respectively, of the blade spar. The preferred geometric shape is a generally conically shaped surface.

In another aspect of the invention, a rotor blade for a helicopter or the like is provided, which comprises a leading edge and a trailing edge, a spar, and a plurality of weight segments installed in the blade adjacent to the leading edge in a spaced end to end arrangement, each weight segment having an outboard end. The rotor blade further comprises a plurality of retention straps equal to the number of weight segments and having a one to one correspondence therewith. Each of the straps is comprised of a resin/fiber prepreg composite material and each of the straps is wrapped around the outboard end of a corresponding weight element. Importantly, the straps are co-cured with the spar and each weight segment has a length sufficient to ensure that the co-cured joint between the strap and the spar is strong enough to permit the strap to substantially solely retain its corresponding weight segment during operation of the rotor blade. Because the weight is segmented, each individual strap must retain only a portion of the total weight. Additionally, because the length of each segment provides sufficient strength for the co-cured joint between strap and spar, the strap can be wrapped over the weight outboard end without complicating the winding of the spar.

In yet another aspect of the invention, a method of fabricating a rotor blade spar assembly for a helicopter or the like is disclosed. The method steps include laying at least one outer torque wrap fabric layer into a cavity mold, providing a rotor blade spar, providing a weight element having an outboard end, an inboard end, an upper surface, and a lower surface, and wrapping a retention strap about the weight element outboard end to create a weight and strap assembly. Then, the weight and strap assembly is placed into the rotor blade spar, and the outer torque fabric layer is folded over the top of the spar to complete the rotor blade spar assembly. Then, the fabricated rotor blade spar assembly is cured in the cavity mold, so that the retention strap and the spar are co-cured.

The invention, together with additional features and advantages thereof, may best be understood by reference to the following description taken in conjunction with the accompanying illustrative drawing.

BRIEF DESCRIPTION OF THE DRAWING

FIG. 1 is a perspective view illustrating a helicopter rotor blade constructed in accordance with the invention, having a plurality of leading edge weights arranged end-to-end which are securely retained therewithin;

FIG. 2 is a cross-sectional view taken along lines 2—2 of FIG. 1, showing the interior construction of the helicopter rotor blade, including the retention assembly for the leading edge weights;

DESCRIPTION OF THE PREFERRED EMBODIMENT

Figure 3:
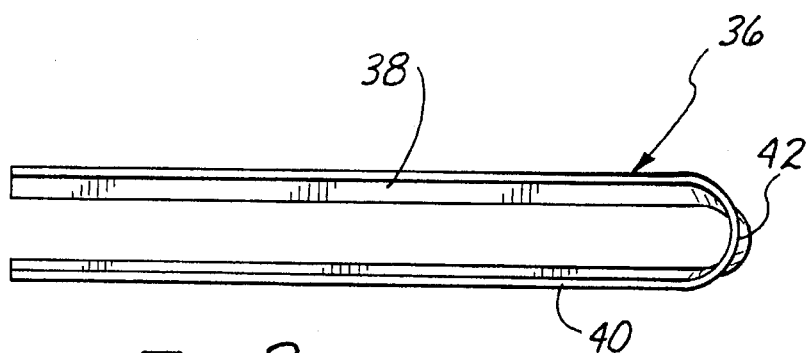
FIG. 3 is a side view in isolation of the retention strap for securing each leading edge weight.

In FIG. 1, there is shown a helicopter rotor blade 10 according to the invention. The rotor blade has a leading edge 12, a trailing edge 14, an upper surface 16, and a lower surface 18 (FIG. 2), and my comprise any known airfoil configuration.

Referring now more particularly to FIG. 2, the rotor blade is constructed about a spar 19, which includes a lower spar cap 22 and an upper spar cap 24. In the preferred embodiment, the spar is comprised of a composite winding. An inner torque wrap 26, comprised of a suitable fabric, or similar filament constructed materials of a type conventional in the art, covers the inner surfaces of each of the spar caps 22 and 24, which together enclose a hollow space 28. Similarly, an outer torque wrap 30, preferably comprised of a plurality of fabric layers 32, covers the outer surfaces of each of the spar caps 22 and 24. The outer torque wrap 30 is, in turn, covered by a skin layer 33 (FIG. 2), which may be metallic, non-metallic, or a combination thereof.

Along the leading edge 12 of the blade 10 lie a plurality of segmented weight elements 34 (FIGS. 1 and 2). As discussed supra in the Background of the Invention portion of the specification, the leading edge weights, or counterweights, 34 function to provide blade chordwise balance and maintain rotor inertia. In the preferred embodiment, as shown in FIG. 1, five weight segments or elements 34, each fabricated of tungsten and having a length of approximately six inches, are utilized to balance the rotor blade to about 25% chord. In other words, the center of gravity of the rotor blade is located at about 25% of the chord rearwardly from the leading edge. The overbalanced rotor blade tip resultant from this particular arrangement has been found to be useful in order to avoid flutter. However, the weights may be constructed of other suitable materials, and many other weight arrangements and configurations may be employed while remaining within the scope of the invention. Regarding the length dimension, about six inches is preferred, but the only requirement is that the length be sufficient to provide adequate strength for the co-cured joint between strap and spar, as will be described more fully hereinbelow.

Figure 4:
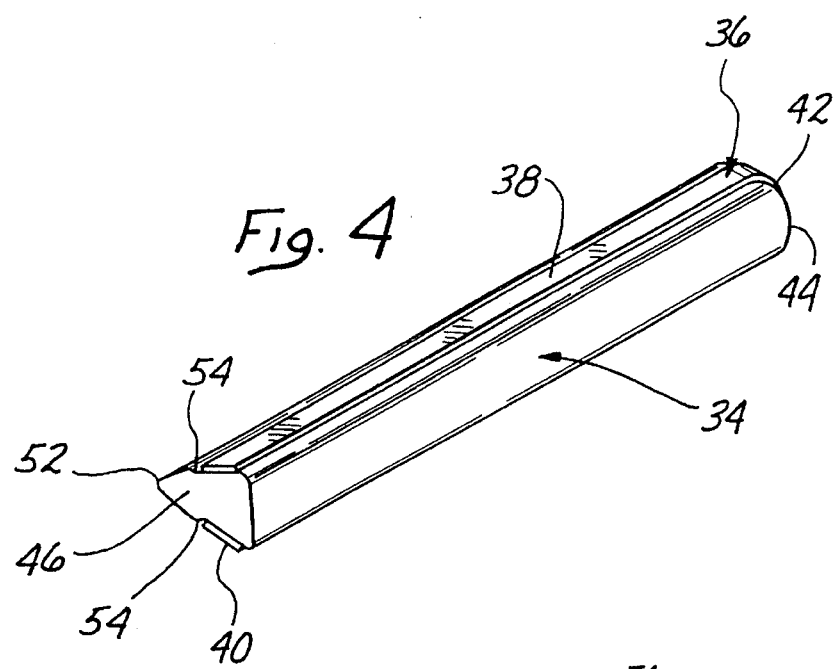
FIG. 4 is a perspective view of a leading edge weight having a retention strap wrapped therearound.

Now referring particularly to FIGS. 2-4, each weight segment 34 is retained in a position adjacent to the leading edge 12 of the rotor blade 10 by means of a retention strap 36. As best shown in FIG. 3, each retention strap 36 is an integral element comprising first and second substantially parallel linear segments or legs 38 and 40, and a curved segment 42. The curved segment 42 joins the two linear segments 38 and 40, sad consequently has a curvature of approximately 180 degrees. The strap 36 is preferably made of a fiber-reinforced plastic material, to be described more fully hereinbelow. Each weight segment 34 preferably includes an outboard or tip end 44, which of course is closest to the rotor blade tip of the helicopter (not shown), and an inboard or hub end 46 (FIG. 4), which is closest to the hub end 47 of the rotor blade (FIG. 1). The weights are preferably installed by wrapping each retention strap 36 around its corresponding weight segment 34, such that the curved segment 42 of the strap is wrapped about the outboard end 44 of its corresponding weight segment. Then, the weight segments 34 are placed in the spar 19 and are subjected to the spar assembly cure cycle. Of course, the strap could be configured in many different ways, and could be designed to completely encircle the weight segment, if desired.

Each weight segment 34 has upper and lower surfaces 48 and 50, respectively, which preferably are not parallel to each other, but rather taper toward one another, such that they conjoin at a leading edge 52 of the weight (FIG. 4). With this preferred configuration, the contour of the weight segment substantially corresponds to the contour of the upper and lower surfaces 16 and 18, respectively, of the blade as they converge at the blade leading edge 12.

An important feature of the invention is that the outboard end 44 of each weight segment 34 is geometrically shaped such that the strap 36 maybe seamlessly wrapped about the weight segment, with the strap legs 38 and 40 being flush-mounted on their corresponding weight surfaces 48, 50 and extending inboard substantially parallel to the blade spar. The preferred geometric shape of the weight segment outboard end 44 is conical, which is created by rounding the end, thereby creating a conical shape by virtue of the tapered configuration of the weight segment surfaces 48 and 50, with the tip of the cone coinciding with the weight segment leading edge 52. In the preferred end configuration, the strap 36 becomes twisted when wrapped therearound, the strap legs 38 and 40 being canted with respect to one another at an angle sufficient to ensure that each respective leg maybe flush-mounted on the non-parallel upper and lower surfaces. This twist of the strap, and the relationship between the strap and its corresponding weight segment, is illustrated most clearly in FIGS. 3 and 4.

Alternatively, the geometric shape of the outboard end 44 maybe cylindrical, if desired. This configuration is achieved by rounding the outboard end of a weight segment which, rather than having tapered upper and lower surfaces, is substantially rectangular.

Whether the weight segment is tapered or rectangular, the outboard end geometric shape is important because, if it were flat, the strap 36 could not easily be wrapped about the weight segment so that the legs 38 and 40 extended inboard substantially parallel to the blade spar, nor could they be readily flush mounted to their respective upper and lower weight surfaces.

Figure 5:
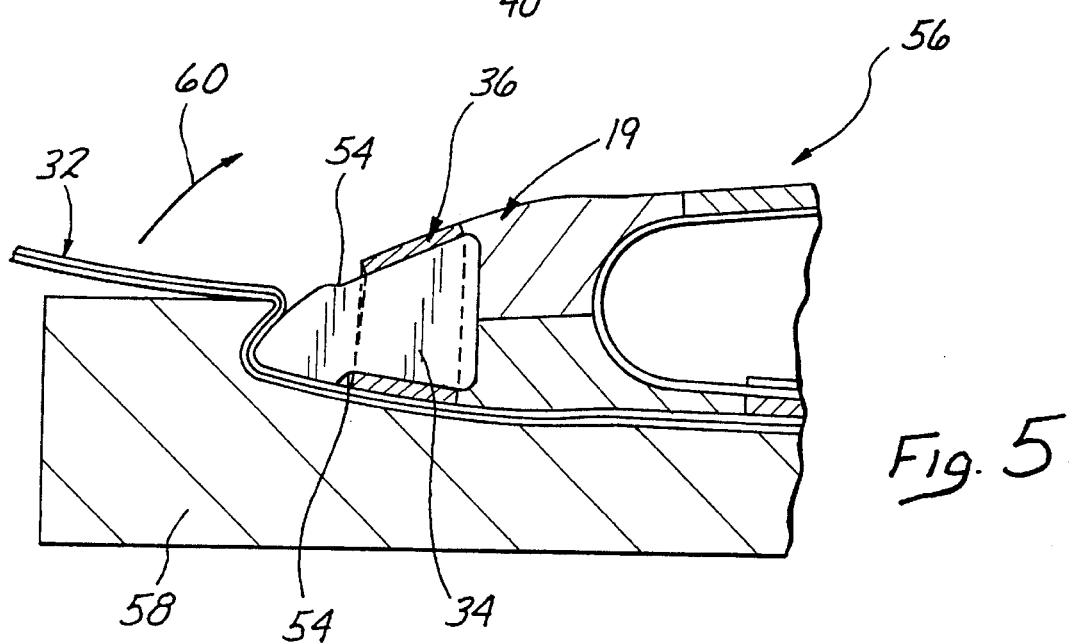
FIG. 5 is a cross-sectional view illustrating a method of assembly of inventive helicopter rotor blade.

Yet another feature of the invention is that the weight segments 34 each have relief grooves 54 on both the lower and upper weight surfaces 48 and 50, respectively. These relief grooves, best seen in FIGS. 2, 4, and 5, are provided to accommodate the straps 36 without interference with the spar fibers, and may be fabricated by any known technique, such as by machining.

Now, with particular reference to FIG. 5, the preferred method for manufacturing the inventive rotor blade spar assembly 56 will be described. The retention strap 36 preferably comprises a length of tape which in turn comprises fibers pre-impregnated in a resin base (prepreg). In the preferred embodiment, the tape has a width of ½ inch, and is supplied by Hexell, Inc., while the fibers comprising the tape are S-2 Glass® fibers manufactured by Owens/Corning Fiberglas Corporation of Toledo, Ohio. Of course other known materials could be employed as well, depending upon the desired application and the properties necessary for that particular application.

The first step in the rotor blade spar assembly process is to apply to the surface of each weight segment 34 a suitable adhesive having metal bonding properties. Particularly if the weight is made of tungsten, as in the preferred embodiment, it is important to first prime the surface of the weights, since tungsten is a difficult material to bond. Once the adhesive has been applied, the tape which will comprise the retention strap is wrapped over the conical outboard end 44 of the weight segment, and across the lower and upper surfaces 48 and 50, respectively, of the weight, so that the weight segment 34 looks similar to that illustrated in FIG. 4. Then, the spar caps 22 and 24 are cut out, or their fibers are displaced, to enable the weight and strap assembly to be placed as a unit into the spar 19 (FIG. 5). The strap adheres to both the weight and the spar because the prepreg material of which it is made is sticky, but does not interfere with the spar fibers because of its position in the relief grooves 54. In the meantime, the outer torque wrap layers 32 are laid into a cavity mold 58, and the spar 19 is positioned thereon, within the mold. Two outer torque wrap layers 32 are illustrated, but in actuality any number of layers maybe used. At this juncture, the spar assembly 56 has not yet been cured. Then, the outer torque layers 32 are folded over the top of the spar 19, in the direction of the arrow 60. Once the spar assembly 56 is complete, it is cured in the mold 58.

In the preferred embodiment, during the cure cycle the straps 36 are co-cured into the spar 19 as well as being bonded onto their corresponding weights 34. As previously described, the length of the weight segment 34, and thus its corresponding strap 36, must be sufficient to provide adequate strength for the co-cured joint between strap and spar, and is preferably about six inches. Additionally, since the weights are substantially completely coated with adhesive prior to being laid up in the spar during fabrication of the rotor blade, they become bonded directly to the spar 19 of the blade 10. Thus, in the preferred embodiment, primary retention of each weight segment is provided by adhesive bonding between the weight and the spar. Secondary retention is by hoop tension in the strap, acting through interlaminar shears at the co-cured interface with the spar. Thus, if the primary bond line between the weight and the spar and/or the weight and the strap fails, the curved segment 42 of the strap 36 acts to retain the weight segment 34 in position, thereby preventing potential rotor failure.

In the preferred embodiment, once the spar assembly 56 has been fabricated and cured, the rotor blade is fabricated by placing the skin around the spar assembly and bonding it thereto, for example by a separate cure cycle. However, it is also possible to fabricate the entire rotor blade in "one shot" by laying up the skin about the rotor blade spar assembly prior to curing, then placing the entire rotor blade assembly into the mold 58 and subjecting it to a single cure cycle. Such an alternative fabrication method, which would still result in the co-curing of the weight and strap assembly with the spar 19, is within the scope of this invention.

Other variants are possible within the scope of the invention as well. For example, the step of applying adhesive to the weight segment maybe deleted, so that the weight segments are not bonded to either their corresponding retention straps 36 or to the spar 19. Then, in operation, hoop tension in the strap provides the primary retention of each weight segment. This "worst case" embodiment was employed by the assignee of this application, McDonnell Douglas Helicopter Company, Inc., when certifying under Federal Aviation Agency (FAA) regulations a rotor blade having leading edge weights mounted in accordance with the principles of this invention. Even though no adhesive was employed, the rotor blade was successfully certified.

The inventive means and method for providing fail-safe retention of helicopter rotor leading edge weights is applicable to any balance or inertia weights installed in a composite helicopter rotor blade spar. Advantageous features include the use of fiber-reinforced plastic straps co-cured with the spar, the geometrically shaped outboard end of the weight segment so that the straps extend inboard parallel to the blade spar, relief grooves in the weight segments to accommodate the straps without interference with the spar fibers, and the capability of installing the weight segment and its retention strap as a single unit into the spar assembly.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method of fabricating a rotor blade spar assembly for a helicopter or the like, comprising the steps of:

a) laying at least one outer torque wrap fabric layer into a cavity mold;

b) providing a rotor blade spar;

c) providing a weight element having an outboard end, an upper surface, and a lower surface;

d) wrapping a retention strap about said weight element outboard end to create a weight and strap assembly;

e) placing said weight and strap assembly into said rotor blade spar;

f) folding said at least one outer torque fabric layer over the top of said spar to complete the rotor blade spar assembly; and g) curing the fabricated rotor blade spar assembly in said cavity mold.

2. A method of fabricating a rotor blade as recited in claim 1, wherein step d) includes the step of coating said weight with an adhesive substance prior to wrapping said strap around said weight element outboard end, thereby providing a bond line between said weight and said strap and between said weight and said spar.

3. A method of fabricating a rotor blade as recited in claim 1, wherein step c) includes providing a plurality of weight elements, and step d) includes wrapping a retention strap about each of said weight elements, thereby creating a plurality of weight and strap assemblies wherein each weight and strap assembly includes a weight element having a separate retention strap wrapped thereabout.

4. A method of fabricating a rotor blade as recited in claim 3, wherein step e) includes placing said plurality of weight and strap assemblies in a spaced, end to end arrangement along the leading edge of said spar.

5. A method of fabricating a rotor blade as recited in claim 1, wherein said retention strap includes a first leg, a second leg, and a curved segment joining said two legs at one end thereof, and step d) includes wrapping the strap about the weight element outboard end such that the first and second legs are substantially flush mounted on said upper and lower surfaces and said curved segment is wrapped about the outboard end of the weight element.

6. A method of fabricating a rotor blade as recited in claim 4, wherein said outboard end has a generally conically shaped surface and said upper and lower surfaces are non-parallel.

\* \* \* \* \*